(12) United States Patent
Ishioka et al.

(10) Patent No.: US 11,823,006 B2
(45) Date of Patent: Nov. 21, 2023

(54) MEASUREMENT CONTROL APPARATUS, MEASUREMENT SYSTEM AND PROGRAM

(71) Applicant: MITUTOYO CORPORATION, Kawasaki (JP)

(72) Inventors: Takayuki Ishioka, Kawasaki (JP); Kenta Fujioka, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 36 days.

(21) Appl. No.: 17/711,672

(22) Filed: Apr. 1, 2022

(65) Prior Publication Data

US 2022/0318537 A1 Oct. 6, 2022

(30) Foreign Application Priority Data

Apr. 5, 2021 (JP) ................. 2021-064487

(51) Int. Cl.
*G06K 7/14* (2006.01)
*G01D 21/00* (2006.01)
*G06F 3/0484* (2022.01)

(52) U.S. Cl.
CPC ......... *G06K 7/1417* (2013.01); *G06F 3/0484* (2013.01)

(58) Field of Classification Search
CPC ............................ G01D 21/00; G06K 7/1417
USPC ...................................................... 235/462.1
See application file for complete search history.

(56) References Cited

FOREIGN PATENT DOCUMENTS

WO WO-2021062933 A1 * 4/2021 ........... G06K 7/1413

* cited by examiner

*Primary Examiner* — Toan C Ly
(74) *Attorney, Agent, or Firm* — GREENBLUM & BERNSTEIN, P.L.C.

(57) ABSTRACT

Facilitate the work of setting the part program used in the measuring device for each object to be measured. A measurement control apparatus of the present invention includes a code reader that reads a code containing at least a part program identification information, and a measurement information providing unit that, when the code is read by the code reader, sends a start command of a part program corresponding to the part program identification information recorded in the code to a measuring device, and causes the measuring device to execute processing according to the part program prepared in advance.

9 Claims, 5 Drawing Sheets

MEASUREMENT CONTROL APPARATUS, MEASUREMENT SYSTEM AND PROGRAM

CROSS-REFERENCE TO RELATED APPLICATION

This non-provisional application claims priority under 35 U.S.C. § 119(a) from Japanese Patent Application No. 2021-064487, filed on Apr. 5, 2021, the entire contents of which are incorporated herein by reference.

BACKGROUND

Technical Field

The present invention relates to a measurement control apparatus, a measurement system and a program that contribute to the realization of efficient measurement work.

Background Art

Measurement of a measurement object and analysis of measured values by a measuring device are carried out, for example, in the following way: an operator checks information for identifying the individual of the measurement object and a part program (a program in which various commands to be executed sequentially according to a flow of measurement and analysis are written together) to be used for measurement, inputs a file name of the part program manually into a control terminal of the measuring device, and causes the measuring device to execute a measurement process according to the part program.

SUMMARY OF THE INVENTION

Problems to be Solved by the Invention

The measurement operator needs to check the part program used for measurement and input necessary information for each measurement object, which is time-consuming and prone to input errors.

In response to the above issue, it is an object of the present invention to provide a measurement control apparatus, a measurement system and a program that contribute to the realization of efficient measurement work.

Means for Solving the Problems

A measurement control apparatus of the present invention includes a code reader that reads a code containing at least part program identification information, and a measurement information providing unit that, when the code is read by the code reader, sends a start command of a part program corresponding to the part program identification information recorded in the code to a measuring device, and causes the measuring device to execute processing according to the part program prepared in advance.

The measurement control apparatus configured in this way automatically identifies the part program by reading the code attached to a measurement object, and the measuring device to which the measurement object is set can be made to execute measurement processing according to the part program. Therefore, it is not necessary to manually input information such as a file name for identifying the part program into the measuring device, thus efficient measurement work can be realized.

The measurement information providing unit may accept in advance registration of a GUI component to which information identifying the part program is associated, and may be configured to be able to send a start command including information identifying the part program to the measuring device by input operation to the GUI component displayed on a display unit. Then the measurement information providing unit may accept the association of the part program identification information that automatically executes input operation with the registered GUI components, may automatically execute input operation to the GUI component associated with the same part program identification information as the part program identification information recorded in the code, when the code is read by the code reader, and send the start command including the information identifying the part program to the measuring device.

The measurement information providing unit may associate the part program identification information to the registered GUI component by accepting the designation of a recording position of the part program identification information in the code and designation of the part program identification information to automatically execute input operation to the GUI component. Then the measurement information providing unit may collate the part program identification information recorded in the designated recording position in the code with the part program identification information associated with the GUI component by designation, and automatically execute input operation for the GUI component that matches.

According to the measurement control apparatus configured in this way, the GUI component such as a launcher button that provides information identifying the part program to the measuring device by input operation is registered in advance, and the part program identification information that automatically executes input operation to the GUI component is set as its property, for example. This makes it possible to easily associate the part program identification information for automatically executing input operation for the GUI component with the part program. As a result, the measurement control apparatus can cause the measuring device to execute measurement processing according to the part program by direct input operation such as clicking on the GUI component or by reading the code in which the same part program identification information as the part program identification information that automatically executes input operation on the GUI component is recorded.

The measurement information providing unit may further associate information identifying which of a plurality of the measuring devices is to be used to the GUI component, when registering the GUI component, and send the start command including the information identifying the part program to the measuring device associated with the GUI component, when input operation to the GUI component is executed.

The measurement control apparatus configured in this way, even when there is a plurality of measuring devices, makes it possible to have a given measurement device execute measurement processing according to the part program by direct input operation such as button clicking or automatic input operation by code reading.

A measurement system of the present invention includes a measurement control apparatus and a measuring device. The measurement control apparatus includes a code reader and a measurement information providing unit. The code reader reads a code containing at least part program identification information and measurement object identification information. The measurement information providing unit, when the code is read by the code reader, sends a start command of a part program corresponding to the part program identification information recorded in the code and the measurement object identification information recorded in the cord to a measuring device, and causes the measuring device to execute processing according to the part program. The measuring device executes processing according to the part program prepared in advance, and outputs measurement results with the measurement object identification information.

The measurement system configured in this way automatically identifies the part program by reading the code attached to a measurement object, and the measuring device to which the measurement object is set can be made to execute measurement processing according to the part program, as well as the measurement object identification information is attached to the measurement results. Therefore, it is not necessary to manually input information such as a file name for identifying the part program and the measurement object identification information such as a serial number that identifies an individual to be measured into the measuring device, thus efficient measurement work can be realized.

The measurement information providing unit may accept in advance registration of a GUI component to which information identifying the part program is associated, and may be configured to be able to send a start command including information identifying the part program to the measuring device by input operation to the GUI component displayed on a display unit. Then the measurement information providing unit may accept the association of the part program identification information that automatically executes input operation with the registered GUI components, may automatically execute input operation to the GUI component associated with the same part program identification information as the part program identification information recorded in the code, when the code is read by the code reader, and may send the start command including the information identifying the part program and the measurement object identification information recorded in the cord to the measuring device.

The measurement information providing unit may associate the part program identification information to the registered GUI component by accepting the designation of a recording position of the part program identification information in the code and designation of the part program identification information to automatically execute input operation to the GUI component. Then the measurement information providing unit may collate the part program identification information recorded in the designated recording position in the code with the part program identification information associated with the GUI component by designation, may automatically execute input operation for the GUI component that matches, may accept the designation of the recording position of the measurement object identification information in the code for the registered GUI component, and may send information read from the recording position in the code to the measuring device as the measurement object identification information when input operation for the GUI component is executed.

According to the measurement system configured in this way, the GUI component such as a launcher button that provides information identifying the part program to the measuring device by input operation is registered in advance, and the part program identification information that automatically executes input operation to the GUI component is set as its property. This makes it possible to easily associate the part program identification information for automatically executing input operation for the GUI component with the part program. As a result, the measurement system can cause the measuring device to execute measurement processing according to the part program by direct input operations such as clicking on the GUI component, and can also cause the measuring device to execute measurement processing according to the part program and outputs the measurement results with the measurement object identifying information by reading the code in which the same part program identification information as the part program identification information that automatically executes input operation on the GUI component is recorded.

The measurement information providing unit may further associate information identifying which of a plurality of the measuring devices is to be used to the GUI component, when registering the GUI component, and send the start command including the information identifying the part program and the measurement object identification information recorded in the code to the measuring device associated with the GUI component, when input operation to the GUI component is executed.

The measurement system configured in this way, even when there is a plurality of measuring devices, makes it possible to have a given measurement device execute measurement processing according to the part program by direct input operation such as button clicking, and also makes it possible to have the given measuring device execute measurement processing according to the part program and outputs the measurement results with the measurement object identifying information by automatic input operation by reading the code.

The measurement information providing unit may be realized by describing its functions in a program and having a computer execute the program.

DETAILED DESCRIPTION OF THE EMBODIMENTS

Hereinafter, embodiments of the present invention will be described with reference to the drawings. In the following description and drawings, the same reference numeral is attached to the same functional parts, and the functional parts once explained are either omitted or explained to the extent necessary.

First Embodiment

Figure 1:
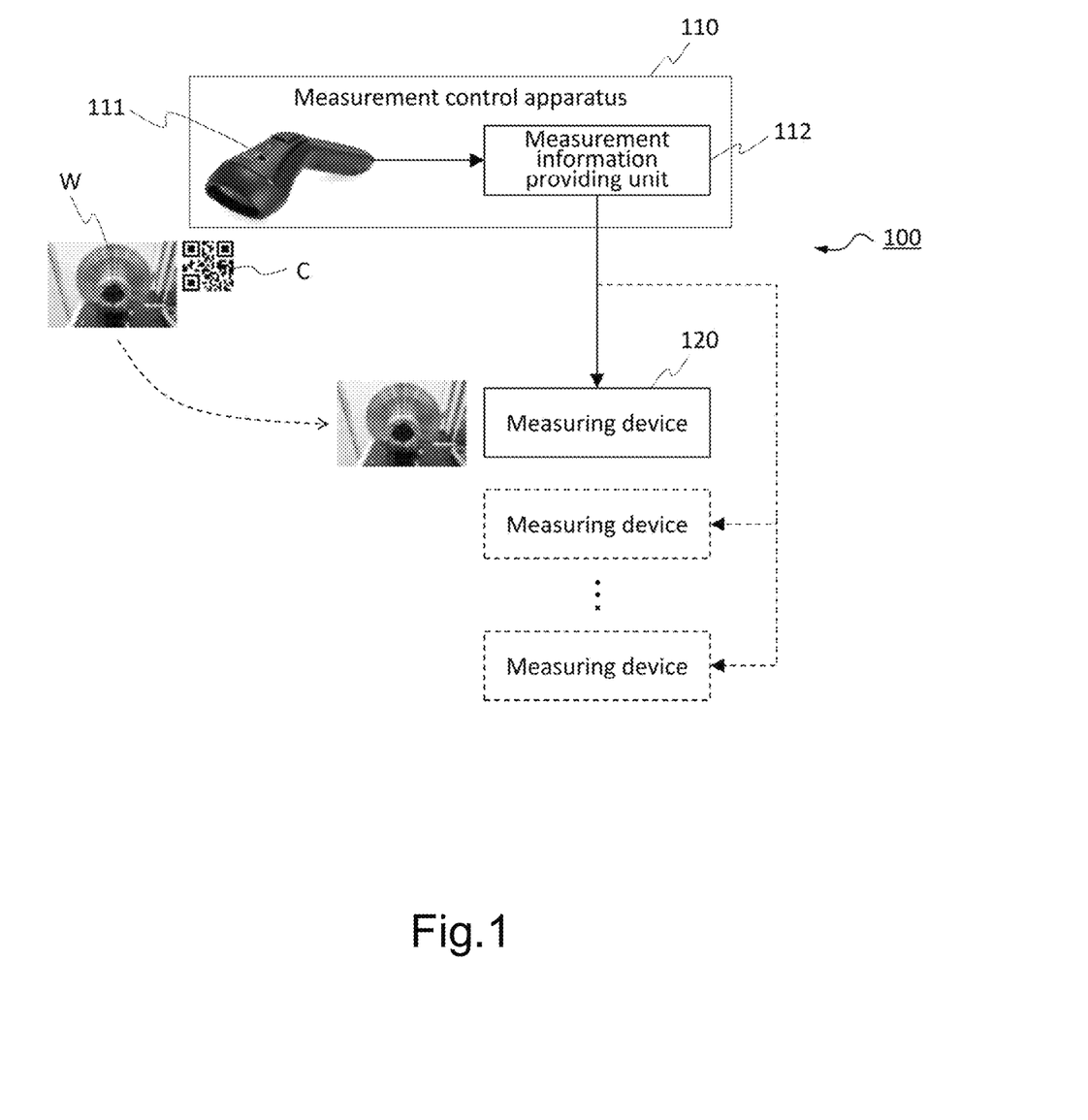
FIG. 1 is a diagram showing configurations of a measurement control apparatus 110 and a measurement system 100.

FIG. 1 is a diagram showing configurations of a measurement control apparatus 110. The measurement control apparatus 110 includes a code reader 111 and a measurement information providing unit 112.

The code reader 111 reads a code C, which is attached to a measurement object W, and containing at least part program identification information. A typical example of the code C is a QR code (registered trademark). However, any dimension and type of code may be selected as long as information to be read, such as the part program identification information, can be recorded. The code reader 111 may be capable of reading the code of the selected dimension and type.

The part program identification information is the information used to identify the part program to be applied to the measurement object W. For example, it may be a number that identifies a product or a product class.

The operator causes the code reader 111 to read the code C corresponding to the measurement object W, and then sets the measurement object W in the measuring device 120. The code C corresponding to the measurement object W, for example, may be read from the one attached to the measurement object W, or may be read from the one printed on a slip or the like.

The measurement information providing unit 112 is preset with the information identifying a part program corresponding to the part program identification information, and when the code C is read by the code reader 111, the measurement information providing unit 112 sends a start command of the part program corresponding to the part program identification information recorded in the code C, or more specifically a start command including information identifying the part program, to the measuring device 120. Then, the measurement information providing unit 112 causes the measurement device 120 to start a part program provided in advance in the measuring device 120, which is identified by information identifying the part program, and to execute processing according to the part program.

The measuring device 120 is any type of measuring device that can be operated by various commands issued by the execution of a control application provided in the measuring device or in a control terminal connected thereto, and can execute continuous processing using the part program. Any connection medium or connection method between the measurement information providing unit 112 and the measuring device 120 can be used, as long as it is possible to send and receive the start command that includes information identifying the part program to be started in the measuring device.

The part program is a description of a series of commands to be issued sequentially by the control application according to the flow of measurement and analysis. The part program may be created in advance by the functions provided by the control application or by other means.

Information identifying the part program includes, for example, the file name of the part program, but any information other than the file name of the part program may be used as long as the target part program can be identified by the information.

In the measurement information providing unit 112, the method of setting information identifying the part program corresponding to the part program identification information in advance is arbitrary. For example, there is a method of preparing a list in which information identifying the part program is associated with each part program identification information. This makes it possible to send the start command containing information identifying the part program corresponding to the part program identification information recorded in the code C to the measuring device 120 by referring to the list upon reading the code C.

Another method is to use a GUI component such as a launcher button with which information identifying the part program is associated. Specifically, for example, using a launcher application that can appropriately set properties of the launcher button, one or more launcher buttons that send the start command including information identifying the part program to the measuring device 120 by input operation such as a click are registered in advance. Then, the part program identification information that automatically executes input operation is associated with each launcher button. The association of the part program identification information to each launcher button is performed, for example, by accepting the designation of the recording position of the part program identification information in the code C and the designation of the part program identification information to automatically execute input operation to the launcher button, from any input unit, as described below.

Then, using the associated launcher button, the measurement information providing unit 112 collates the part program identification information recorded in the code C against the part program identification information associated with the launcher button upon reading the code C, and automatically executes input operation for the launcher button that matches. This makes it possible to send the start command that includes information identifying the part program associated with the matched launcher button to the measuring device 120.

Figure 2:
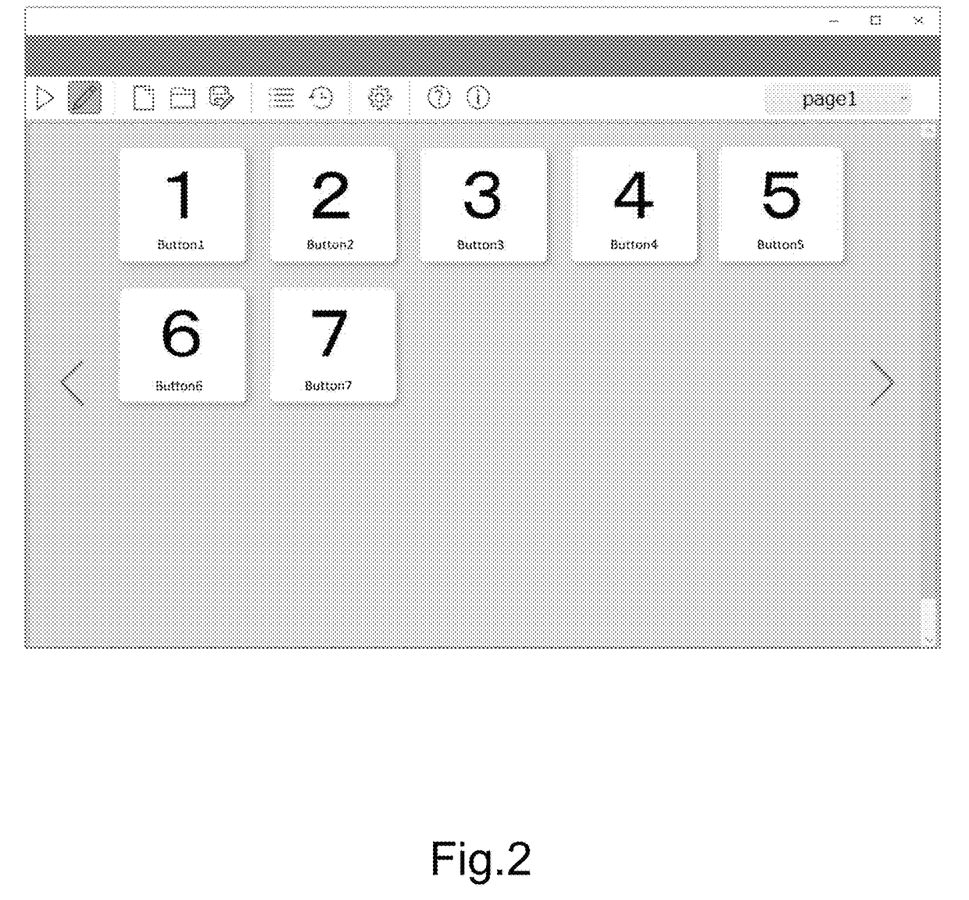
FIG. 2 is a diagram showing an example of a display screen of a launcher application.
Figure 3:
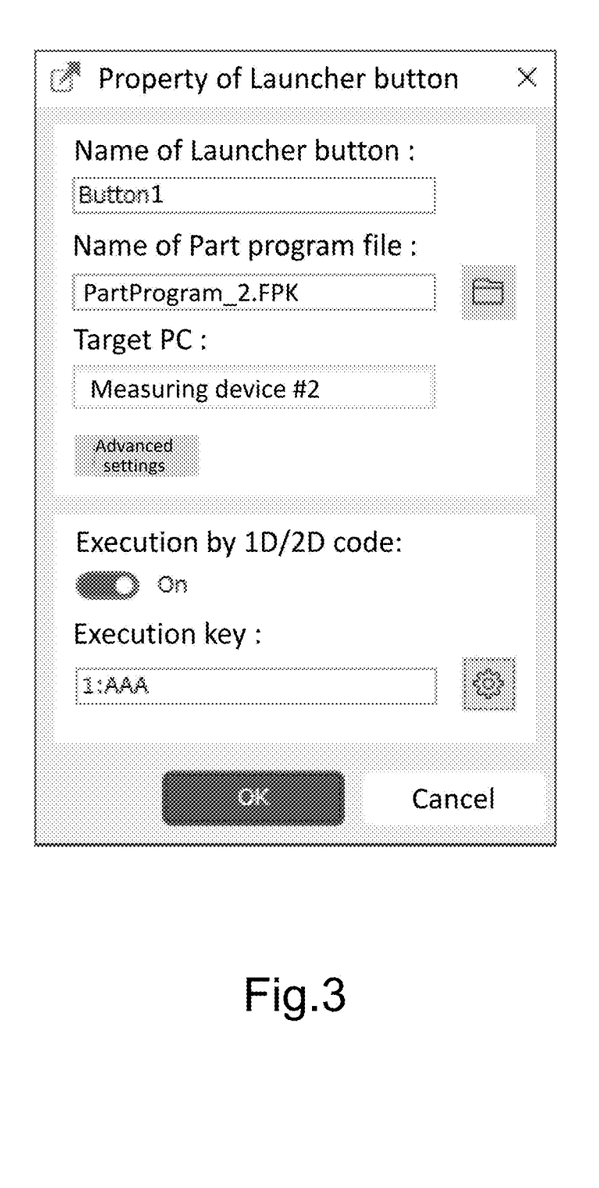
FIG. 3 is a diagram showing an example of a property setting screen that associates a launcher button with a file name of the part program.

FIG. 2 shows an example of a display screen of a launcher application with seven launcher buttons. As a property of such a launcher button, first, information identifying the part program is associated. FIG. 3 shows an example of a property setting screen that associates the launcher button with the file name of the part program. In the example of this property setting screen, in addition to the file name of the part program, which is information identifying the part program, the target PC for starting the part program can also be set. For example, the setting screen may be configured to be able to select and set a PC that has both functions as the measurement information providing unit 112 and as a control terminal for measuring devices 120, or any one of one or more measurement devices that are connected via a network to the measurement information providing unit 112 as the target PC. By associating the file name of the part program and the target PC with the launcher button on the setting screen configured in this way, the part program with the file name can be executed on the target PC by input operation such as clicking on the launcher button on the launcher application screen displayed on an arbitrary display unit.

Figure 4:
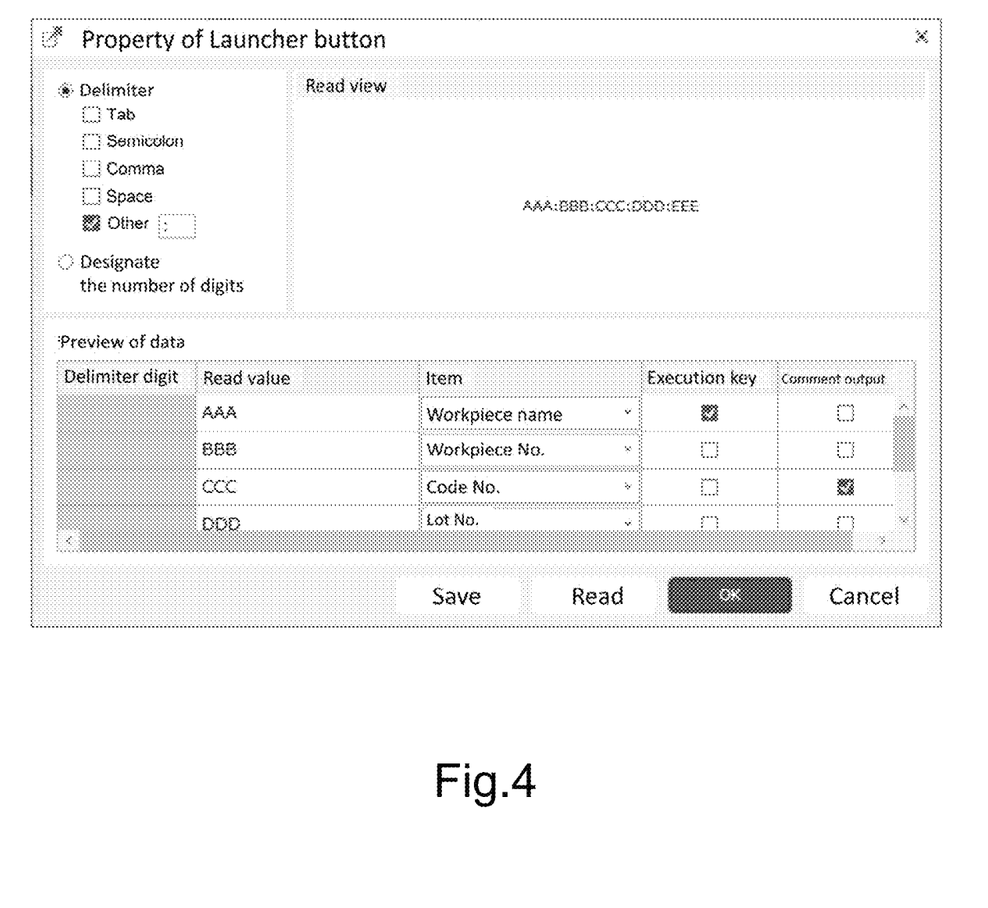
FIG. 4 is a diagram showing an example of a property setting screen that associates a launcher button with the part program identification information.

Then, to the launcher button that has been associated in this way, the part program identification information that automatically executes input operation for the launcher button is further associated as the property. FIG. 4 shows an example of the property setting screen that associates the part program identification information with the launcher button. This setting screen is used to set the information to be read as the part program identification information among the plurality of information included in the code C read by the code reader 111, and the part program identification information for automatic execution of input operations to the launcher button. Specifically, the information set in the field of the read value of the row in which the check box in the column of an execution key is checked is associated with the launcher button as the part program identification information that automatically executes input operation for the launcher button.

FIG. 4 shows an example of reading a product code in which information such as "workpiece name", "workpiece No.", "code No.", and "lot No." are separated by delimiters. In the example shown in FIG. 4, five pieces of information "AAA", "BBB", "CCC", "DDD", and "EEE", separated by a colon ":", which are the delimiters, are set in the first through fifth rows as read values for the first through fifth recording positions, respectively.

Then, by checking the checkbox of the execution key corresponding to the first read value, the recording position of the part program identification information in code C is designated as the first recording position, and the part program identification information that automatically executes input operation for the launcher button is designated as "AAA", the first read value. In this way, "AAA" is associated with the launcher button as the part program identification information that automatically executes input operation for the launcher button. As a result, the part program identification information associated with the launcher button is associated with information identifying the part program associated with the launcher button in the property setting screen shown in FIG. 3. Incidentally, it is also possible to check the checkboxes for multiple execution keys.

By setting the launcher buttons as described above, when a code C is read, the identity of the part program identification information recorded at the designated recording position in the read code C and the part program identification information associated with the launcher button by designation is collated for each launcher button. In the example shown in FIG. 4, if the information recorded in the first recording position of the read code C is "AAA", input operation for the launcher button associated with "AAA" as the first read value, which is the part program identification information, is automatically executed. As a result, the start command including information identifying the part program associated with the launcher button is sent to the measuring device 120, and the measuring device 120 can be made to execute processing according to the part program. From a different point of view, the part program identification information can also be referred to as launcher button designation information, since the launcher button is selected to automatically execute input operation corresponding to the part program identification information recorded in the code C. Incidentally, as shown in the property setting screen in FIG. 3, a switch may be provided to select whether or not to automatically send the startup command when the code C is read.

The measurement control apparatus 110 configured as described above automatically identifies the part program by reading the code C attached to the measurement object W, and the measuring device 120 to which the measurement object W is set can be made to execute the measurement processing according to the part program. Therefore, it is not necessary to manually input information such as a file name for identifying the part program into the measuring device 120, and efficient measurement work can be realized.

In addition, by associating the part program identification information for automatically executing input operation for the GUI component with the part program using the GUI component, the part program identification information for automatically executing input operation for the GUI component can be easily associated with the part program. This makes it possible to have the measuring device 120 execute measurement processing according to the part program by direct input operations such as clicking on the GUI component or by reading a code in which the same part program identification information as the part program identification information that automatically executes input operation on the GUI component is recorded.

Further, by making it possible to arbitrarily designate the part program identification information that automatically executes input operation for the launcher button, a number or other information previously attached to the product for product management can be used as the part program identification information, without issuing a special code for the measurement control apparatus of the present invention. Furthermore, a plurality of measurement objects W (a plurality of different codes C) can be associated with one launcher button, and it is not necessary to provide a launcher button for each measurement object W. In the example shown in FIG. 4, just by associating "AAA" as the first read value with the launcher button, even if the code C is different for each measurement object W, as long as the workpiece name (record information of the first record position), which is the part program identification information, is "AAA", even if the workpiece No, code No, and lot No are different, they are all associated with the same launcher button and associated with the same part program.

Second Embodiment

FIG. 1 is a diagram showing configurations of a measurement system 100. The measurement system 100 includes a measurement control apparatus 110 and a measuring device 120. The measurement control apparatus 110 includes a code reader 111 and a measurement information providing unit 112.

The code reader 111 reads a code C, which is attached to a measurement object W, and containing at least part program identification information. A typical example of the code C is a QR code (registered trademark). However, any dimension and type of code may be selected as long as information to be read, such as the part program identification information, can be recorded. The code reader 111 may be capable of reading the code of the selected dimension and type.

The part program identification information is the information used to identify the part program to be applied to the measurement object W. For example, it may be a number that identifies a product or a product class. The measurement object identification information is information that identifies the measurement object W from other measurement objects W, and examples thereof include information such as a serial number.

The operator causes the code reader 111 to read the code C corresponding to the measurement object W, and then sets the measurement object W in the measuring device 120. The code C corresponding to the measurement object W, for example, may be read from the one attached to the measurement object W, or may be read from the one printed on a slip or the like.

The measurement information providing unit 112 is preset with information identifying a part program corresponding to the part program identification information, and when the code C is read by the code reader 111, the measurement information providing unit 112 sends a start command of the part program corresponding to the part program identification information recorded in the code C, or more specifically, the start command that includes information identifying the part program and the measurement object identification information recorded in the code C to the measuring device 120. Then, the measurement information providing unit 112 causes the measurement device 120 to start a part program provided in advance in the measuring device 120, which is identified by information identifying the part program, and to execute processing according to the part program.

In the measurement information providing unit 112, the method of setting information identifying the part program corresponding to the part program identification information in advance and further enabling the measurement object identification information recorded in the code C to be provided to the measurement device 120 is arbitrary, for example, the method of using GUI components such as launcher buttons.

Specifically, for example, using a launcher application that can appropriately set properties of the launcher button, one or more launcher buttons that send the start command including information identifying the part program to the measuring device 120 by input operation such as a click are registered in advance. Then, the part program identification information that automatically executes input operation and the recording position in the code C of the measurement object identification information to be provided to the measuring device 120 are associated with each launcher button. The association of the part program identification information and the recording position of the measurement object identification information in the code C to each launcher button is performed, for example, by accepting the designation of the recording position of the part program identification information in the code C, the designation of the part program identification information to automatically execute input operation to the launcher button, and the designation of the recording position of the measurement object identification information in the code C, from any input unit, as described below.

Then, using the associated launcher button, the measurement information providing unit 112 collates the part program identification information recorded in the code C against the part program identification information associated with the launcher button upon reading the code C, and automatically executes input operation for the launcher button that matches. This makes it possible to send the start command including information identifying the part program associated with the matched launcher button to the measuring device 120, and also send the measurement object identification information recorded in the designated recording position of the code C to the measuring device 120.

FIG. 2 shows an example of a display screen of a launcher application with seven launcher buttons. As a property of such a launcher button, first, information identifying the part program is associated. FIG. 3 shows an example of a property setting screen that associates the launcher button with the file name of the part program. In the example of this property setting screen, in addition to the file name of the part program, which is information identifying the part program, the target PC for starting the part program can also be set. For example, the setting screen may be configured to be able to select and set a PC that has both functions as the measurement information providing unit 112 and as a control terminal for measuring devices 120, or any one of one or more measurement devices that are connected via a network to the measurement information providing unit 112 as the target PC. By associating the file name of the part program and the target PC with the launcher button on the setting screen configured in this way, the part program with the file name can be executed on the target PC by input operation such as clicking on the launcher button on the launcher application screen displayed on an arbitrary display unit.

Then, to the launcher button that has been associated in this way, the part program identification information that automatically executes input operation for the launcher button and the recording position of the measurement object identification information in the code C are further associated as the property. FIG. 4 shows an example of the property setting screen that associates the part program identification information and the recording position in the code C of the measurement object identification information with the launcher button. This setting screen is used to set information to be read as the part program identification information among the plurality of information included in the code C read by the code reader 111, the part program identification information for automatic execution of input operations to the launcher button, and information to be read as the measurement object identification information among the plurality of information included in the code C read by the code reader 111. Specifically, the information set in the field of the read value of the row in which the check box in the column of an execution key is checked is associated with the launcher button as the part program identification information that automatically executes input operation for the launcher button. In addition, the position of the read value for which the check box in the column of a comment output is checked is associated with the launcher button as the recording position in the code C of the measurement object identification information.

FIG. 4 shows an example of reading a product code in which information such as "workpiece name", "workpiece No.", "code No.", and "lot No." are separated by delimiters. In the example shown in FIG. 4, five pieces of information "AAA", "BBB", "CCC", "DDD", and "EEE", separated by a colon ":", which are the delimiters, are set in the first through fifth rows as read values for the first through fifth recording positions, respectively.

Then, by checking the checkbox of the execution key corresponding to the first read value, the recording position of the part program identification information in code C is designated as the first recording position, and the part program identification information that automatically executes input operation for the launcher button is designated as "AAA", the first read value. In this way, "AAA" is associated with the launcher button as part program identification information that automatically executes input operation for the launcher button. As a result, the part program identification information associated with the launcher button is associated with information identifying the part program associated with the launcher button in the property setting screen shown in FIG. 3.

In addition, by checking the checkbox for the comment output corresponding to the third read value, this is designated as the recording position of the measurement object identification information in the code C, and is associated with the launcher button. Incidentally, it is also possible to check the checkboxes for multiple execution keys and the checkboxes for multiple comment output.

By setting the launcher buttons as described above, when a code C is read, the identity of the part program identification information recorded at the designated recording position in the read code C and the part program identification information associated with the launcher button by designation is collated for each launcher button. In the example shown in FIG. 4, if the information recorded in the first recording position of the read code C is "AAA", input operation for the launcher button associated with "AAA" as the first read value, which is the part program identification information, is automatically executed. As a result, the start command including information identifying the part program associated with the launcher button is sent to the measuring device 120, and the measuring device 120 can be made to execute processing according to the part program. In addition, the information recorded in the third recording position of the code C is sent to the measurement device 120 as the measurement object identification information, and the measurement object identification information can be provided to the measurement device 120. From a different point of view, the part program identification information can also be referred to as launcher button designation information, since the launcher button is selected to automatically execute input operation corresponding to the part program identification information recorded in the code C. Incidentally, as shown in the property setting screen in FIG. 3, a switch may be provided to select whether or not to automatically send the startup command when the code C is read.

The measuring device 120 is any type of measuring device that can be operated by various commands issued by the execution of a control application provided in the measuring device or in a control terminal connected thereto, and can execute continuous processing using the part program. Any connection medium or connection method between the measurement information providing unit 112 and the measuring device 120 can be used, as long as it is possible to send and receive the start command that includes information identifying the part program to be started in the measuring device.

The measuring device 120, based on information identifying the part program provided by the measurement information providing unit 112, identifies one of one or more different part programs and executes measurement processing according to the identified part program on the measurement object W, and outputs measurement results with the measurement object identification information provided by the measurement information providing unit 112.

Figure 5:
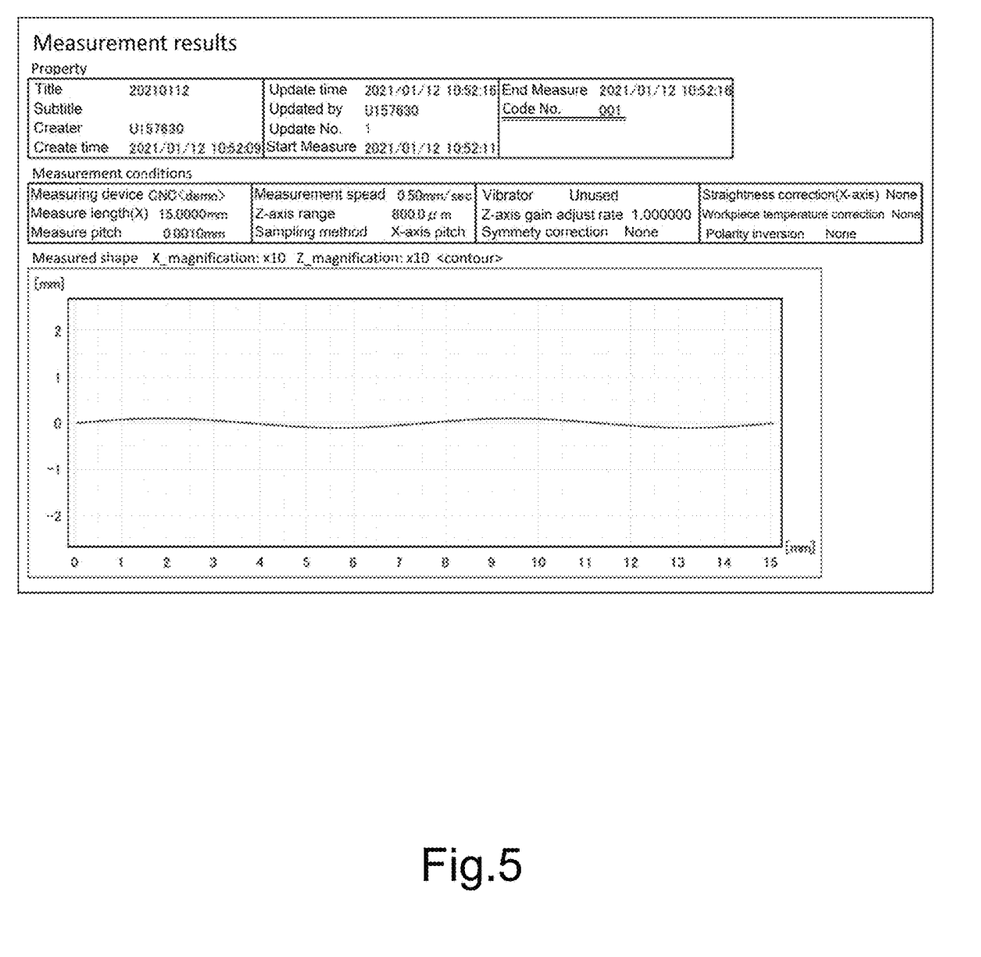
FIG. 5 is a diagram showing an example of an output of the measurement results to which the measurement object identification information is attached.

To output the measurement object identification information with the measurement results, for example, when executing a control application that is responsible for the function of acquiring the measurement results from the measuring device 120 and outputting them as they are or after analysis, the measurement object identification information provided by the measurement information providing unit 112 can be taken in and included in the measurement results for output. For example, use a control application that can execute commands to make it record arbitrary input information and output the recorded information as part of the measurement results. Then, the measurement information providing unit 112 sends the command with the measurement object identification information to the measuring device 120, and the measuring device 120 receives and executes the command using the control application, enabling the measurement object identification information to be output as part of the measurement results. FIG. 5 shows an example of an output of the measurement results, in which 001, the measurement object identification information sent from the measurement information providing unit 112, is displayed together with the item name of Code No.

According to the measurement system 100 configured as described above, the part program is automatically identified by reading the code C corresponding to the measurement object W, and the measurement process according to the part program is executed in the measuring device 120 in which the measurement object W is set, and the measurement object identification information is attached to the measurement results. Therefore, it is not necessary to manually input information such as a file name for identifying the part program and the measurement object identification information such as a serial number that identifies an individual to be measured into the measuring device, thus efficient measurement work can be realized.

In addition, by using GUI components, associating the part program identification information that automatically executes the input operation to the GUI component with the part program, and setting the recording position of the measurement object identification information in the code, it is possible to easily associate the part program identification information that automatically executes the input operation to the GUI component with the part program, and to easily extract the measurement object identification information from the code. This makes it possible to have the measuring device execute measurement processing according to the part program by direct input operations such as clicking on the GUI component, and also makes it possible to have the measuring device execute measurement processing according to the part program and outputs the measurement results with the measurement object identifying information by reading a code in which the same part program identification information as the part program identification information that automatically executes input operation on the GUI component is recorded.

Further, by making it possible to arbitrarily designate the part program identification information that automatically executes input operation for the launcher button, a number or other information previously attached to the product for product management can be used as the part program identification information, without issuing a special code for the measurement control apparatus of the present invention. Furthermore, a plurality of measurement objects W (a plurality of different codes C) can be associated with one launcher button, and it is not necessary to provide a launcher button for each measurement object W. In the example shown in FIG. 4, just by associating "AAA" as the first read value with the launcher button, even if the code C is different for each measurement object W, as long as the workpiece name (record information of the first record position), which is the part program identification information, is "AAA", even if the workpiece No, code No, and lot No are different, they are all associated with the same launcher button and associated with the same part program. Furthermore, by associating the recording position of the measurement object identification information in the code C with the launcher button, even when the workpiece name is the same "AAA" and the same part program is executed, a different code No. for each measurement object can be extracted from the code C and attached to the measurement results, making it easy to determine which measurement object the measurement result corresponds to.

In each embodiment, the measurement information providing unit 112 may be realized by describing its functions in a program and having a computer execute the program.

The present invention is not limited to the above embodiments and variations. The above-mentioned embodiments and variations are examples only, and anything having a configuration substantially the same as the technical idea described in the claims of the present invention and producing similar effects is included in the technical scope of the present invention. In other words, changes can be made as appropriate within the scope of the technical ideas expressed in the present invention, and forms with such changes and improvements are also included in the technical scope of the present invention.

What is claimed is:

1. A measurement control apparatus comprising:
a code reader that reads a code containing at least part program identification information; and
a measurement information provider that, when the code is read by the code reader, sends a start command of a part program corresponding to the part program identification information recorded in the code to a measuring device, and causes the measuring device to execute processing according to the part program prepared in advance,
wherein the measurement information provider:
accepts in advance registration of a GUI component to which information identifying the part program is associated as a property, and is configured to be able to send a start command including the information identifying the part program to the measuring device by input operation to the GUI component displayed on a display;
accepts association of the part program identification information that automatically executes input operation with the registered GUI components; and
automatically executes input operation to the GUI component associated with the same part program identification information as the part program identification information recorded in the code, when the code is read by the code reader, and sends the start command including the information identifying the part program to the measuring device.

2. The measurement control apparatus according to claim 1,
wherein the measurement information provider:
associates the part program identification information to the registered GUI component by accepting the designation of a recording position of the part program identification information in the code and designation of the part program identification information to automatically execute input operation to the GUI component; and
collates the part program identification information recorded in the designated recording position in the code with the part program identification information associated with the GUI component by designation, and automatically executes input operation for the GUI component that matches.

3. The measurement control apparatus according to claim 1,
wherein the measurement information provider:
further associates information identifying which of a plurality of the measuring devices is to be used to the GUI component, when registering the GUI component; and
sends the start command including the information identifying the part program to the measuring device associated with the GUI component, when input operation to the GUI component is executed.

4. The measurement control apparatus according to claim 2,
wherein the measurement information provider:
further associates information identifying which of a plurality of the measuring devices is to be used to the GUI component, when registering the GUI component; and
sends the start command including the information identifying the part program to the measuring device associated with the GUI component, when input operation to the GUI component is executed.

5. A non-transitory recording medium recording a program for causing a computer to function as the measurement information provider according to claim 1.

6. A measurement system comprising: a measurement control apparatus and a measuring device, wherein the measurement control apparatus comprises:
a code reader that reads a code containing at least part program identification information and measurement object identification information; and
a measurement information provider that, when the code is read by the code reader, sends a start command of a part program corresponding to the part program identification information recorded in the code and the measurement object identification information recorded in the cord to a measuring device, and causes the measuring device to execute processing according to the part program, and
wherein the measuring device executes processing according to the part program prepared in advance, and outputs measurement results with the measurement object identification information, and
wherein the measurement information provider:
accepts in advance registration of a GUI component to which information identifying the part program is associated as a property, and is configured to be able to send a start command including the information identifying the part program to the measuring device by input operation to the GUI component displayed on a display;
accepts association of the part program identification information that automatically executes input operation with the registered GUI components; and
automatically executes input operation to the GUI component associated with the same part program identification information as the part program identification information recorded in the code, when the code is read by the code reader, and sends the start command including the information identifying the part program and the measurement object identification information recorded in the code to the measuring device.

7. The measurement system according to claim 6,
wherein the measurement information provider:
associates the part program identification information to the registered GUI component by accepting the designation of a recording position of the part program identification information in the code and designation of the part program identification information to automatically execute input operation to the GUI component;
collates the part program identification information recorded in the designated recording position in the code with the part program identification information associated with the GUI component by designation, and automatically executes input operation for the GUI component that matches; and
accepts designation of the recording position of the measurement object identification information in the code for the registered GUI component, and sends information read from the recording position in the code to the measuring device as the measurement object identification information when input operation for the GUI component is executed.

8. The measurement system according to claim 6,
wherein the measurement information provider:
further associates information identifying which of a plurality of the measuring devices is to be used to the GUI component, when registering the GUI component; and
sends the start command including the information identifying the part program and the measurement object identification information recorded in the code to the measuring device associated with the GUI component, when input operation to the GUI component is executed.

9. The measurement system according to claim 7,
wherein the measurement information provider:
further associates information identifying which of a plurality of the measuring devices is to be used to the GUI component, when registering the GUI component; and
sends the start command including the information identifying the part program and the measurement object identification information recorded in the code to the measuring device associated with the GUI component, when input operation to the GUI component is executed.

* * * * *

UNITED STATES PATENT AND TRADEMARK OFFICE
CERTIFICATE OF CORRECTION

PATENT NO. : 11,823,006 B2
APPLICATION NO. : 17/711672
DATED : November 21, 2023
INVENTOR(S) : T. Ishioka et al.

It is certified that error appears in the above-identified patent and that said Letters Patent is hereby corrected as shown below:

In the Claims

Column 14, Line 19 Claim 6, Line 12 change "in the cord" to -- in the code --

Signed and Sealed this
Twenty-sixth Day of March, 2024

*Katherine Kelly Vidal*

Katherine Kelly Vidal
*Director of the United States Patent and Trademark Office*